US007603262B2

(12) United States Patent
Chen et al.

(10) Patent No.: US 7,603,262 B2
(45) Date of Patent: *Oct. 13, 2009

(54) TIME DEPENDENT PROCESS PARAMETERS AND ENGINEERING CHANGE NUMBER CONFLICT REPORT

(75) Inventors: Martin Chen, Los Gatos, CA (US);
Shailesh P. Mane, San Jose, CA (US);
Gaurav Sharma, San Jose, CA (US); Qi Wang, Cupertino, CA (US); Dallan Clancy, Belmont, CA (US); Mario Günter Rothenburg, Eppelheim (DE);
Uwe Kohler, Dielheim (DE)

(73) Assignee: SAP AG, Walldorf (DE)

( * ) Notice: Subject to any disclaimer, the term of this patent is extended or adjusted under 35 U.S.C. 154(b) by 563 days.

This patent is subject to a terminal disclaimer.

(21) Appl. No.: 10/850,796

(22) Filed: May 20, 2004

(65) Prior Publication Data
US 2005/0261887 A1    Nov. 24, 2005

(51) Int. Cl.
*G06G 7/48* (2006.01)
*G06G 7/75* (2006.01)
*G06G 7/00* (2006.01)
*G06F 15/00* (2006.01)
*G06F 19/00* (2006.01)
*G06F 17/00* (2006.01)
*G06F 9/46* (2006.01)
*G06F 17/50* (2006.01)
*A01K 5/02* (2006.01)

(52) U.S. Cl. .............................. 703/6; 700/95; 700/96; 700/97; 700/98; 700/102; 705/9; 705/29

(58) Field of Classification Search ................ 703/2, 703/6; 700/95–98, 102; 705/9, 29
See application file for complete search history.

(56) References Cited

U.S. PATENT DOCUMENTS

| 5,191,534 | A  | * | 3/1993 | Orr et al. ............... 700/105 |
| 5,737,728 | A  | * | 4/1998 | Sisley et al. .............. 705/8 |
| 6,871,182 | B1 | * | 3/2005 | Winnard et al. ............ 705/7 |
| 6,928,396 | B2 | * | 8/2005 | Thackston ............... 703/1 |
| 7,069,101 | B1 | * | 6/2006 | Arackaparambil et al. .. 700/121 |
| 7,103,434 | B2 | * | 9/2006 | Chernyak et al. ........... 700/98 |

(Continued)

OTHER PUBLICATIONS

Glovia, "Engineering Change", Mar. 06, 2002, Fujitsu, 3 pages.*

(Continued)

*Primary Examiner*—Kamini S Shah
*Assistant Examiner*—Suzanne Lo
(74) *Attorney, Agent, or Firm*—Kenyon & Kenyon LLP

(57) ABSTRACT

A method and apparatus for computer modeling the production process is disclosed. An integrated product and process engineering system may be a computer modeling system that models both a generic production process and a specific individual production process. The integrated product and process engineering system may store one or more time dependent process parameters related to the production process and one or more engineering change numbers related to different product designs. The effective time periods of the time dependent process parameters may be compared with the effective time periods of the engineering change numbers. Various flags may be associated with each comparison to indicate the validity of the time dependent process parameter.

9 Claims, 10 Drawing Sheets

U.S. PATENT DOCUMENTS 7,162,318 B1 * 1/2007 Brearley et al. ............... 700/97
7,171,344 B2 * 1/2007 Lind ............................ 703/6
7,280,990 B2 * 10/2007 Turner et al. ................. 706/45

OTHER PUBLICATIONS

Nanua Singh, "Integrated product and process design: a multi-objective modeling framework", 2002, Robotics and Computer Integrated Manufacturing 188, pp. 157-168.*

Nahm et al., "Integrated Product and Process Modeling for Collaborative Design Environment", Mar. 2004, Sage Publications, concurrent Engineering: Research and Arplications, col. 12, No. 1, pp. 5-23.*

Lakshman, Bulusu "Oracle Developer Forms Techniques", Chapter 9, Feb. 18, 2000, 17 pp.*

* cited by examiner

TIME DEPENDENT PROCESS PARAMETERS AND ENGINEERING CHANGE NUMBER CONFLICT REPORT

CROSS REFERENCE TO RELATED APPLICATIONS

This application is related by common inventorship and subject matter to co-filed and co-pending applications titled "Time Dependent Process Parameters for Integrated Process and Product Engineering" and "Interfaces from External Systems to Time Dependent Process Parameters in Integrated Process and Product Engineering", filed May 20, 2004. Each of the aforementioned applications is incorporated herein by reference in its entirety.

TECHNICAL FIELD OF THE INVENTION

The present invention pertains to a computer modeling system for modeling a production process. More particularly, the present invention pertains to detecting conflicts between time dependent process parameters and engineering change numbers.

BACKGROUND INFORMATION

Supply network planning (SNP) computer-modeling applications are used to plan out the production, or manufacturing, process for a product. SNP computer-modeling is typically only performed once a design for the product is finalized and all necessary specific component parts have been chosen. The planning horizon is usually from six to eighteen months, or even longer. The planning parameters used are usually not constant during the planning horizon. The changing values of planning parameters may adversely affect the quality and accuracy of the SNP runs over time.

An example of the changing values of these planning parameters is illustrated in the graph of FIG. 1. As shown in FIG. 1, when a new semiconductor product is introduced for production, the beginning yield rate is usually low. Then upon mastering the production process used, the yield rate may improve significantly over time. The targeting yield rates may change quarterly or even monthly. Therefore, using a fixed value representing the yield may adversely affect the ability of planners to properly forecast needed supplies or materials due to over-planning or under-planning.

SUMMARY OF THE INVENTION

A method and apparatus for computer modeling the production process is disclosed. An integrated product and process engineering system may be a computer modeling system that models both a generic production process and a specific individual production process. The integrated product and process engineering system may store one or more time dependent process parameters related to the production process and one or more engineering change numbers related to different product designs. The effective time periods of the time dependent process parameters may be compared with the effective time periods of the engineering change numbers. Various flags may be associated with each comparison to indicate the validity of the time dependent process parameter.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

An integrated product and process engineering (IPPE) system may be a computer modeling system that models both a generic production process and a specific individual production process. The computer modeling system may store one or more time dependent process parameters (TDPPs) related to the production process and one or more engineering change numbers (ECNs) related to different product designs. The effective time periods of the TDPPs may be compared with the effective time periods of the ECNs. Various flags may be associated with each comparison to indicate the validity of the TDPP.

Figure 1:
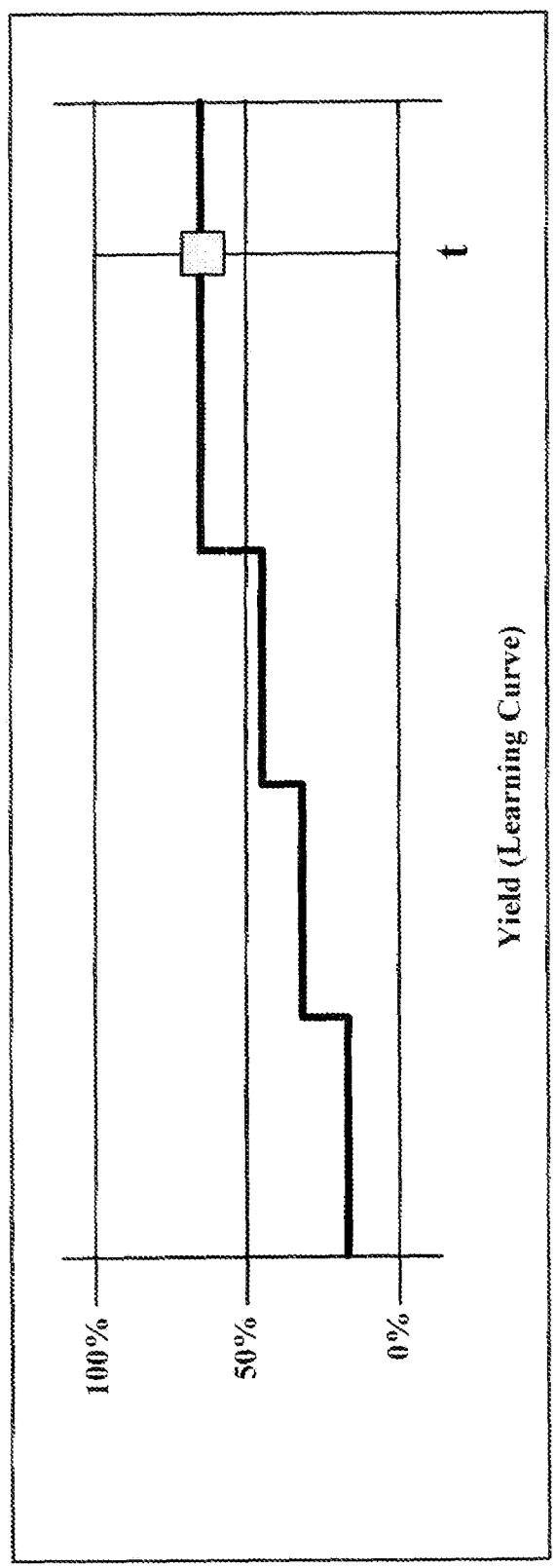
FIG. 1 illustrates the changing values of planning parameters in a graph form.
Figure 2:
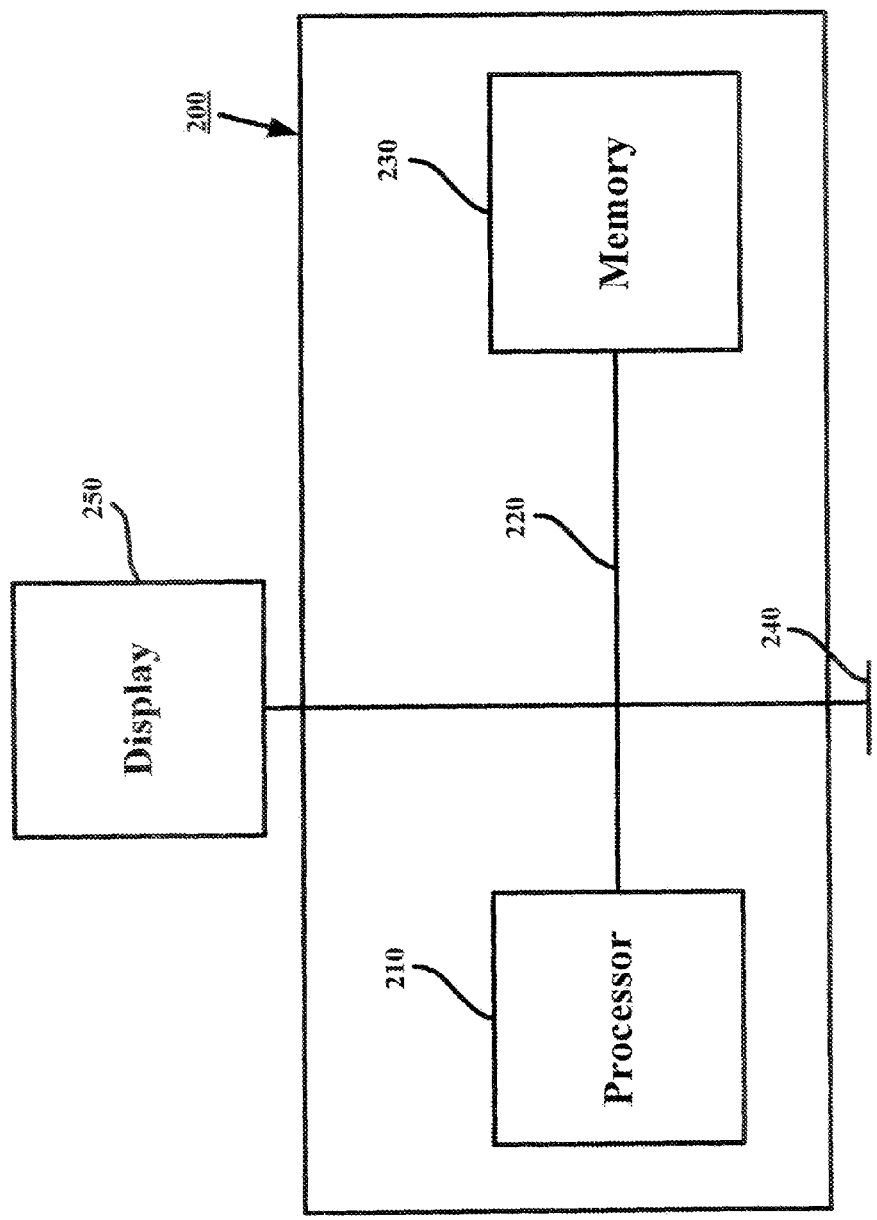
FIG. 2 illustrate in a block diagram one embodiment of a computer modeling system that may be used to implement the present invention.

FIG. 2 is a block diagram of one embodiment of a computer modeling system that may be used to implement the present invention. A computer modeling system 200 may include a processor 210 connected by a bus 220 to a memory 230. The processor 210 can be any type of processor capable of executing software or other computer code, such as a microprocessor, digital signal processor, microcontroller, or the like. The computer modeling system 200 can be a personal computer (PC), mainframe, handheld device, portable computer, set-top box, or any other system that implements software or other computer code.

The memory 230 may be a hard disk, a floppy disk, random access memory (RAM), read only memory (ROM), flash memory, or any other type of machine medium readable by processor 210. The memory 230 may store instructions for performing the execution of the various method embodiments of the present invention such as methods shown in FIGS. 5-7 and 10-11. The processing system 200 may also have an interface 240 for the input and output of data and a display 250 to display the data.

The production process may be modeled on an IPPE system. Various nodes may be set up to represent raw materials needed to make finished goods, actions that must be performed during the production process, and tools and devices that may be used to perform those actions. The IPPE system may represent the relationships between those nodes, and used to calculate further nodes and parameters. Designing a production process for manufacturing a new product may be given greater flexibility by first creating a generic production process model before creating a specific production process model. The generic production process model may use abstracts of the different raw materials, actions, and tools without getting into specifics required by the design of the product. Once the specific design of the product is in place, a more specific production process model may be designed using the generic production process model. For example, a generic production process model for a manufacturing a computer may include generic representations of the hard drive, processor, and other parts, while the specific production process model may specify the type and brand of hard drive and processor needed to produce the specific computer design.

An IPPE engine is a software tool that allows for modeling both a generic production process and a specific individual production process. The IPPE may be run on any type of processing system, such as the computer modeling system 200 shown in FIG. 2. TDPPs may be used to represent those facets of the production process that have a value that may change over time, either due to improvements in the production process or for other reasons.

Figure 3:
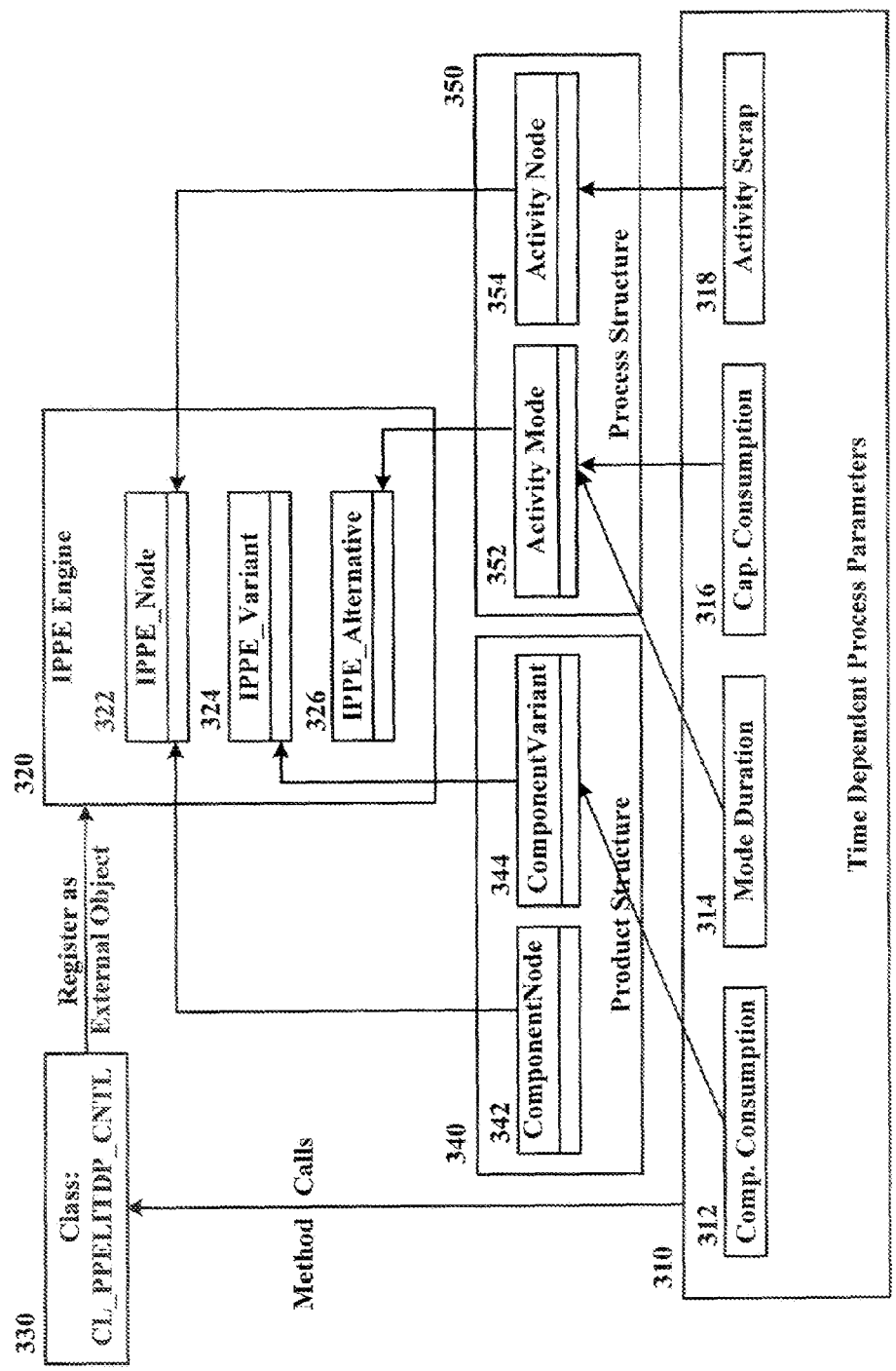
FIG. 3 illustrates in a block diagram one embodiment of the implementation of TDPP in an IPPE architecture according to the present invention.

FIG. 3 illustrates one embodiment of the implementation of TDPP in an IPPE architecture. The TDPPs 310 may be implemented as external objects to the IPPE engine 320 that performs the modeling of the production process. A new global class 330 may be created for the TDPPs 310 which will be registered with the IPPE as an external object. This global class 330 may contain the TDPP data. The TDPP data may include a parameter value and a date and time when the parameter value is in effect. This class 330 may also be used to implement existing interfaces that will allow the class to use method calls to save, copy, and delete TDPP data.

TDPPs may include input/output component consumption 312, activity duration 314, resource capacity consumption 316, and activity scrap 318. For example, input/output component consumption 312 may be the amount of raw materials needed to manufacture a finished product. Activity duration 314 may be the length of time needed to manufacture a finished product. Resource capacity consumption 316 may be tools and other items needed to manufacture a finished product. Activity scrap 318 may be the leftover waste produced during the manufacturing process. Other TDPPs may be added to the system as required to model the production process.

The IPPE engine 320 may interact with IPPE node data 322, IPPE variant data 324, and IPPE alternative data 326. An IPPE node is the subordinate term for all nodes that may exist in an IPPE environment. The IPPE nodes 322 represent general components and functions of the product, such as product structures 340, process structures 350, factory layouts, IPPE line designs, color schemes, or production resources. The product structures 340 may include component node data 342 and component variant data 344 and process structures 350 may include activity mode data 352 and activity node data 354. The IPPE nodes may be given different types to regulate their different aspects and attributes. For example, an IPPE node may be assigned a component node type 342 to represent product components or functions, a color node type to represent colors, an activity node type 354 to represent the process structure, a factory layout node type to represent factory layout functions, and resource node types to represent production resources. The node types may also be assigned a level, such as access level, view level, or structure level. This assignment may determine whether the node is the header of a structure, gives a view of a structure, or is part of a structure.

IPPE variant data 324 may be a concrete instance of an IPPE node. IPPE variants 324 may be created and edited at nodes of the product structure or at color nodes. Component variant data 344, a type of IPPE variant data 324, is a format for displaying the product structure for products that have many variants. The product variant structure is particularly suited to products that consist of a large number of individual materials and products that are made-to-order and configured-to-order.

IPPE alternative data 326 may represent alternative assemblies of a part that is to be produced. An IPPE alternative 326 groups together several relationships that point to subordinate nodes. IPPE alternatives 326 exist at structure nodes in the product structure or process structure. In the process structure, alternative nodes may define how and where an activity is executed. Activity mode data 352, a type of IPPE alternative data, may define how and where an activity is to be executed. The activity mode 352 may give a detailed description of how the activity is to take place. Several modes may be created for each activity.

The TDPPs 310 may be extensions of existing product structures 340 and process structures 350. Component consumption TDPP data 312 are extensions of component variant data 344. Mode duration TDPP data 314 and resource capacity consumption 316 are extensions of activity mode data 352. Activity scrap TDPP data 318 are extensions of activity node data 354.

Figure 4:
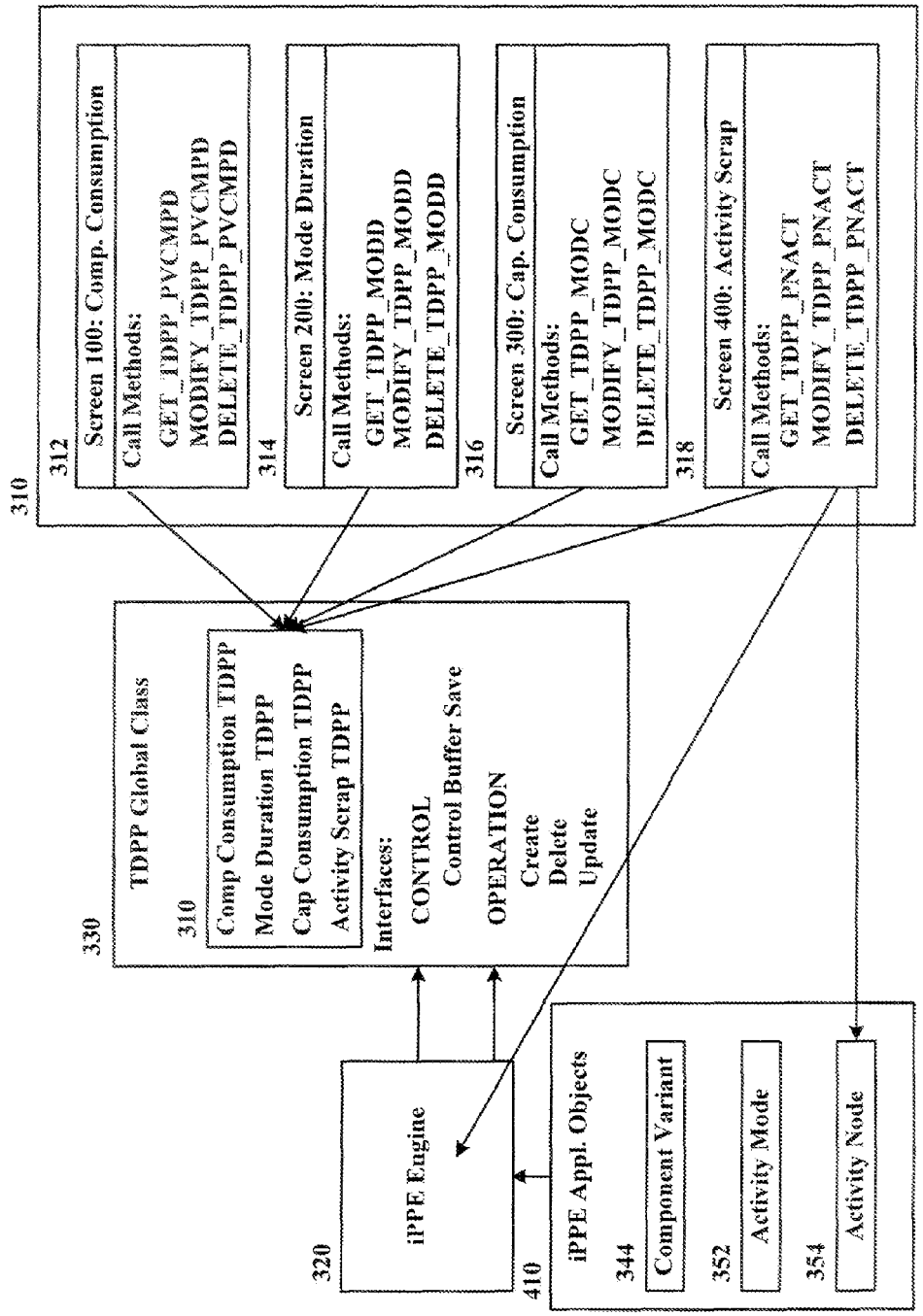
FIG. 4 illustrates in a block diagram one embodiment of the interactions with the IPPE engine according to the present invention.

FIG. 4 illustrates one embodiment of the interactions between the IPPE engine 320, the existing IPPE objects 410, the TDPP global class 330, and the TDPP function group 310. The IPPE engine 320 uses the TDPP global class 330 to create instances of the TDPP data, along with the TDPP function group 310, for whatever TDPP data type is needed. The TDPP global class 330 may include functions for creating, deleting, and modifying the stored TDPP data, in addition to other possible functions. The TDPP data appears to the IPPE engine 320 as a standard IPPE application object, such as component variant data 344 for TDPP component consumption data 312, activity mode data 354 for TDPP mode duration data 314 and TDPP capacity consumption data 316, and activity node data 354 for TDPP activity scrap data 318.

Figure 5:
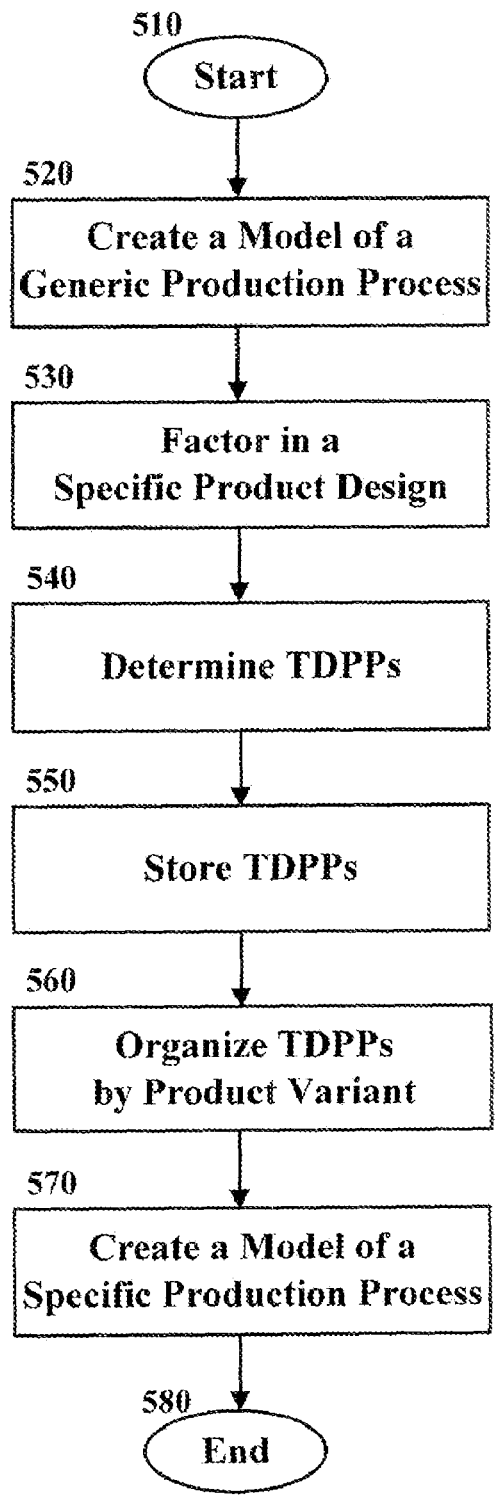
FIG. 5 illustrates in a flowchart one embodiment of the modeling performed by the IPPE engine according to an embodiment of the present invention.

FIG. 5 illustrates in a flowchart one embodiment of the modeling performed by the IPPE engine 320. The IPPE engine 320 starts (Block 510) by creating a generic model of a generic production process for producing a product (Block 520). The IPPE engine may then factor in a specific product design into the model (Block 530). The IPPE engine 320 may then determine the TDPPs resulting from that specific product design (Block 540). Alternatively, the TDPPs may be provided by some source external to the computer modeling system, calculated by the user and inputted into the system, or provided by some other method known in the art. The IPPE engine 320 may store the TDPPs related to the specific product design in the storage memory 230 (Block 550). In one embodiment, the IPPE engine 320 may organize the TDPPs by product variant (Block 560). A product variant may be a set of the products that include some minor alteration to the product that does not rise to the level of an improvement of the design of the product. For example, a product may come in a variety of colors that require different times to apply, so the activity duration TDPP for each colored product would be different. The IPPE engine 320 may then create a specific model of the specific individual production process for that specific product design using the TDPPs and the generic model, among other factors, (Block 570), ending this phase of the modeling process (Block 580).

Figure 6:
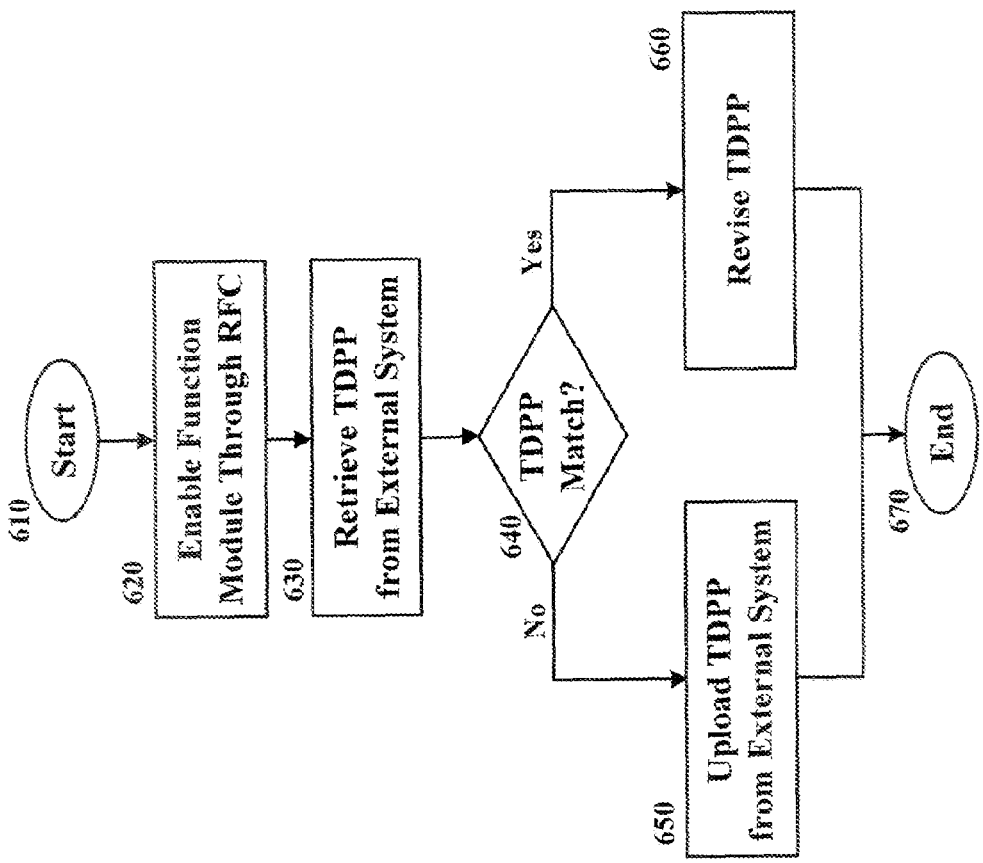
FIG. 6 illustrates in a flowchart one embodiment of a method of loading and revising TDPP data according to an embodiment of the present invention.

FIG. 6 illustrates in a flowchart one embodiment of a method of loading and revising TDPP data. The IPPE engine 320 starts (Block 610) by using a remote function call to enable a function module (Block 620) to read TDPP data from an external system (Block 630). If the TDPP data does not match a product variant and start time all ready in the system (Block 640), the TDPP data is uploaded and added to the storage memory 230 with the rest of the TDPP data (Block 650), ending this phase of the process (Block 660). If the TDPPs match a product variant and start time all ready in the system (Block 640), the stored TDPPs are revised to match the external data (Block 670), ending this phase of the process (Block 660). In alternate embodiments, different function modules may perform each of these actions or one function module may perform all these actions.

Figure 7:
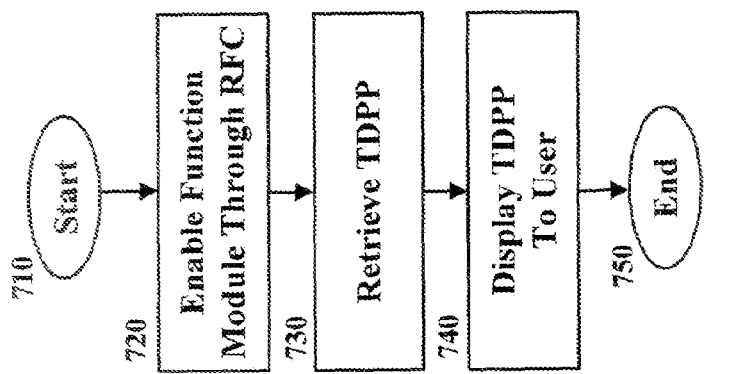
FIG. 7 illustrates in a flowchart one embodiment of a method of reading TDPP data according to an embodiment of the present invention.

FIG. 7 illustrates in a flowchart one embodiment of a method of reading TDPP data. The IPPE engine 320 starts (Block 710) by using a remote function call to enable a function module (Block 720) to read TDPP data stored in the processing system 200 (Block 730). The function module may then display the TDPPs to the user (Block 740), ending this phase of the process (Block 750). In alternate embodiments, different function modules may perform each of these actions or one function module may perform all these actions.

Figure 8:
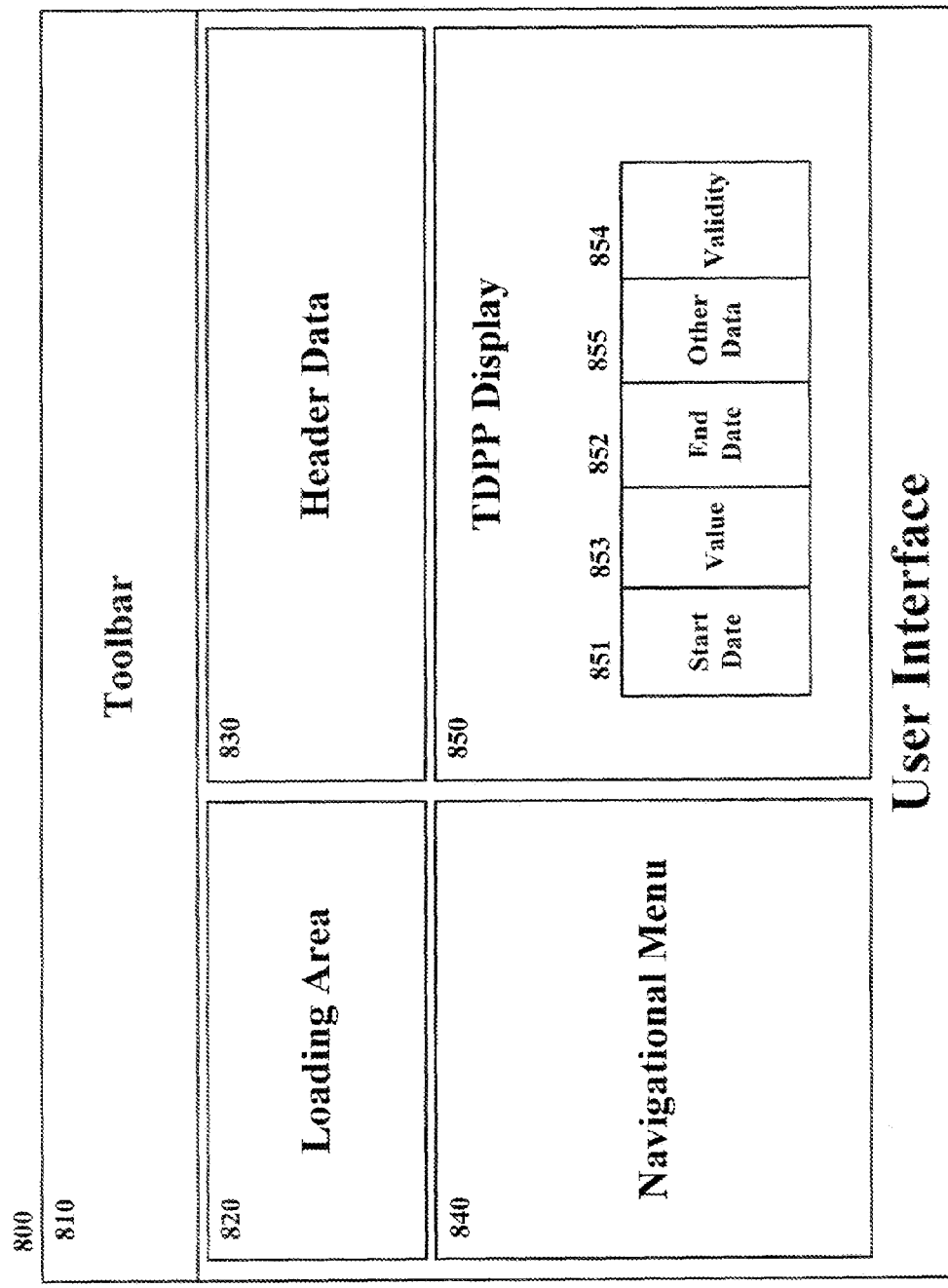
FIG. 8 illustrates in a block diagram one embodiment of a user interface as presented to a user according to an embodiment of the present invention.

FIG. 8 illustrates in a block diagram one embodiment of a user interface 800 as presented to a user on the display 250. The user interface 800 may have a toolbar 810 for standard software functions such as save, delete, edit, and others. The user interface may also have a loading area 820 to load any IPPE objects, such as a process structure or product structure. A user may enter into the loading area 820 certain selection criteria of the object to be loaded, such as the name of the IPPE object. Header data 830 for the TDPP data may be provided. A navigational menu 840 may allow a user to select a product variant. The TDPP display 850 will then show TDPP data keyed to that product variant. The TDPP display 851 may show a start time 851 and an end time 852 for each TDPP, indicating the time period when that TDPP is in effect. In many cases, including an end time 852 will be impractical. In those instances the effective time period for the TDPP may be bound by the start time 851 for that TDPP and the start time 851 for a subsequent TDPP. The TDPP display 250 may also show a parameter value 853, a validity flag 854 to signal whether the TDPP is valid, and any other data 855.

Figure 9:
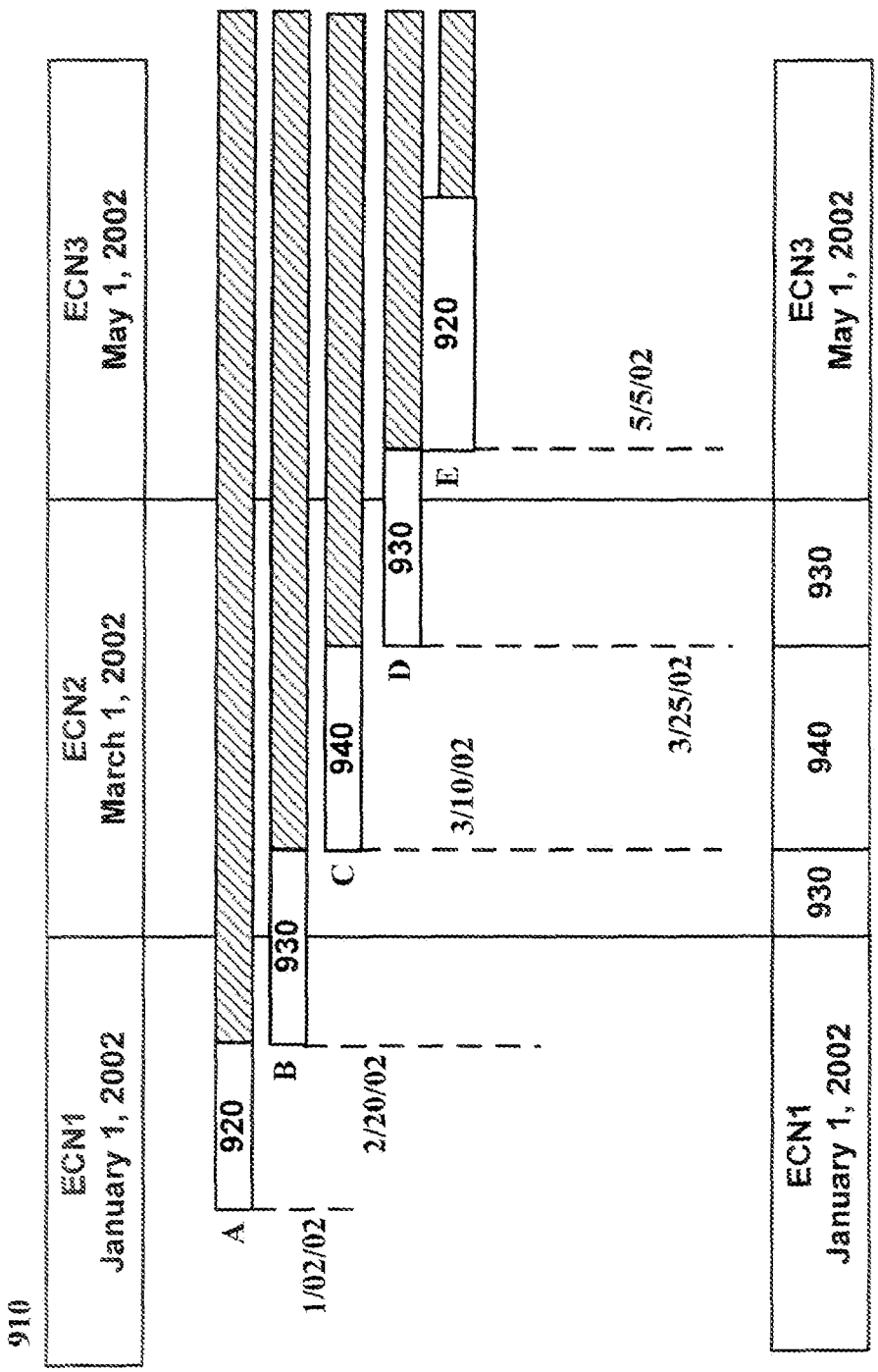
FIG. 9 illustrates one embodiment of how validity is determined for the TDPPs according to an embodiment of the present invention.

TDPP validity may come up where changes have been made to the product design. These changes are normally signaled by the ECN, which indicates which product design is in effect for the production process. FIG. 9 illustrates one embodiment of how validity is determined for the TDPPs. The ECNs 910 are valid for a set period of time. For example, ECN1 is valid from Jan. 1, 2002 to Mar. 1, 2002, ECN2 is valid from Mar. 1, 2002 to May 1, 2002, and ECN3 is valid from May 1, 2002 onward. TDPP A is valid from Jan. 2, 2002 to Feb. 20, 2002, TDPP B is valid from Feb. 20, 2002 to Mar. 10, 2002, TDPP C is valid from Mar. 10, 2002 to Mar. 25, 2002, TDPP D is valid from Mar. 25, 2002 to May 5, 2002, and TDPP E is valid from May 5, 2002 onward. For ECN 2, TDPP A and TDPP E are invalid 920, because they occur completely outside the time period for ECN2. TDPP B and TDPP D are valid 930 for the portion of their time period that overlaps with the time period for ECN2. TDPP C is valid 940 for the entire time period.

Figure 10:
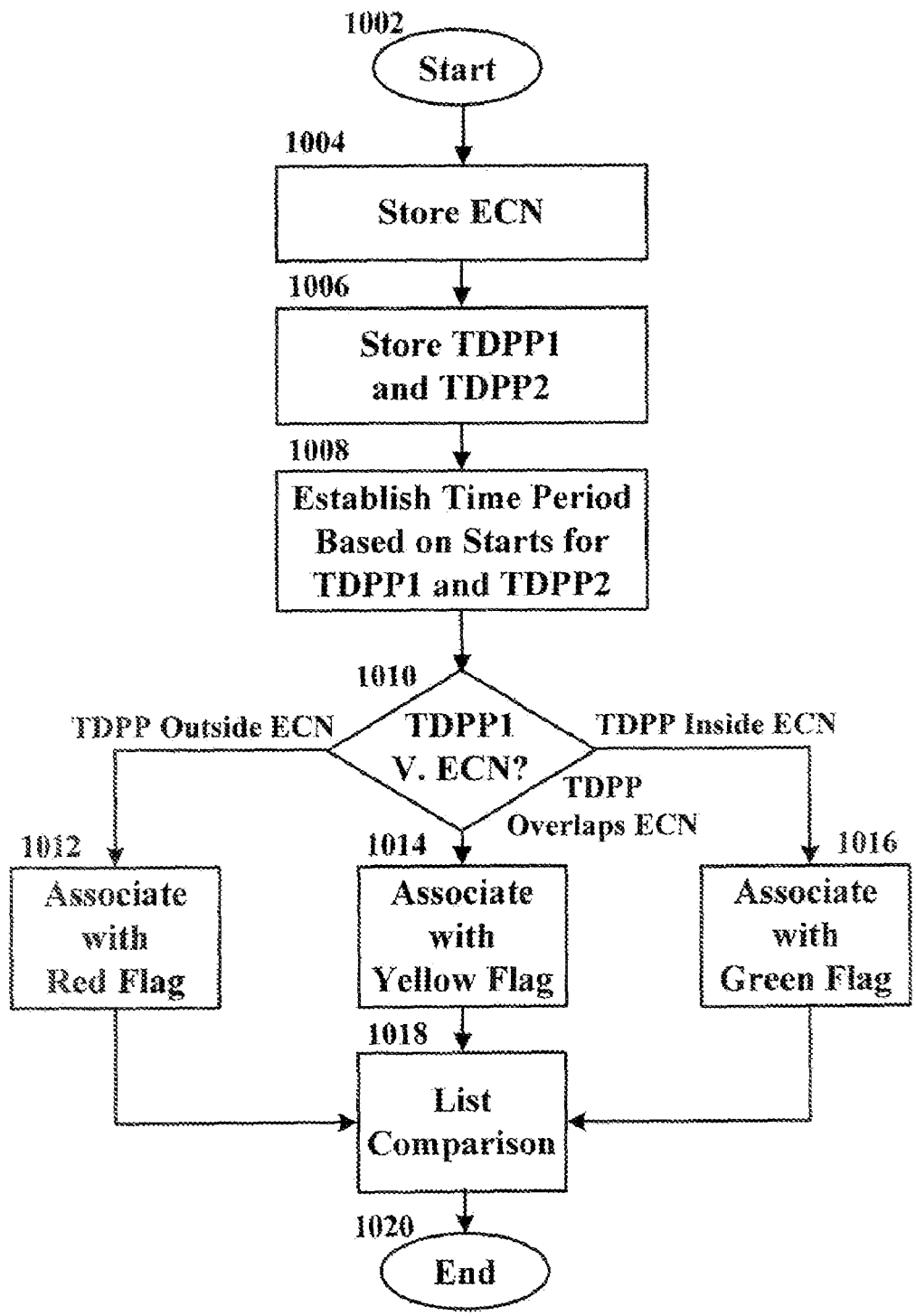
FIG. 10 illustrates in a flowchart one embodiment of a method for determining the validity of a TDPP when taking an ECN into account according to an embodiment of the present invention.

FIG. 10 illustrates in a flowchart one embodiment of a method for determining the validity of a TDPP when taking an ECN into account. The IPPE engine 320 starts the process (Block 1002) by storing any associated ECNs in the storage memory 230 (Block 1004). The IPPE engine 320 then stores a first TDPP1 and a second TDPP2 (Block 1006). The IPPE engine then establishes an effective time period for TDPP1 based on the start time of TDPP1 and the start time of TDPP2 (Block 1008). The effective time period of the TDPP1 is compared with the effective time period of the ECN (Block 1010). If the effective time period of the TDPP1 is wholly outside the effective time period of the ECN, the IPPE engine associates the comparison with a first type of icon, such as a red flag (Block 1012). If the effective time period of the TDPP1 overlaps with the effective time period of the ECN, the IPPE engine associates the comparison with a second type of icon, such as a yellow flag (Block 1014). If the effective time period of the TDPP1 is wholly within the effective time period of the ECN, the IPPE engine associates the comparison with a third type of icon, such as a green flag (Block 1016). The IPPE engine may then list the comparison, with its appropriate flag, and display it on the display 250 to the user (Block 1018), ending the process (Block 1020).

Figure 11:
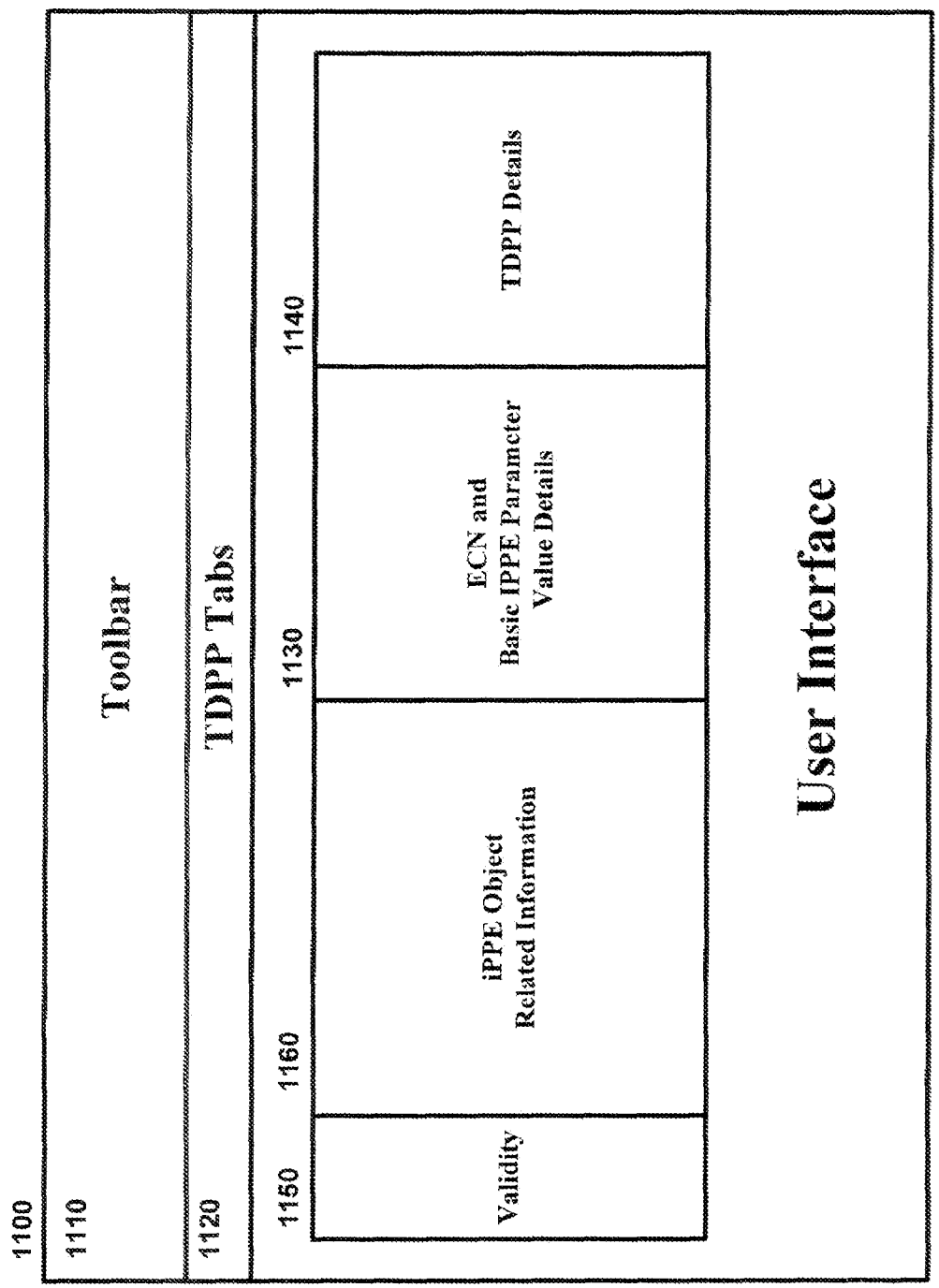
FIG. 11 illustrates in a block diagram one embodiment of a user interface 1200 showing a list of the comparisons between the ECNs and the TDPPs as presented to a user according to an embodiment of the present invention.

FIG. 11 illustrates in a block diagram one embodiment of a user interface 1100 showing a list of the comparisons between the ECNs and the TDPPs as presented to a user on the display 250. The user interface 1100 may have a toolbar 1110 for standard software functions such as save, delete, edit, and others. A series of tabs 1120 may allow the user to select which TDPP is desired. Once that TDPP is selected, the user may be shown ECN and basic IPPE parameter value details 1130, TDPP details 1140, validity flags for the comparison between the two 1150, and IPPE object related information 1160.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

The invention claimed is:

1. A method of modeling a production process, comprising:
   creating a model of a production process for a product design for a product using an integrated product and process engineering system, wherein the production process is modeled as a hierarchy of nodes, wherein the production process initially refers to a product design model that identifies product components generically by product type but is revised over time to integrate product component selections for each product, and wherein the production process nodes are data objects supported by an integrated product and process engineering software framework, said creating the production process model comprising:
   creating a set of nodes for the production process model under user control;
   assigning relationships between the set of nodes;
   adding to the production process model an additional set of nodes based on the prior set of nodes and the relationships between the prior set of nodes; and
   repeating said assigning and said adding steps until the model is finished;

when the product design model is revised to identify a new product component selection, reading a data object associated with a selected product component to determine if it is characterized by a time dependent process parameter (TDPP);
if so, instantiating a TDPP for the selected product component using a global TDPP class that interfaces with the integrated product and process engineering software framework;
registering the TDPP with the integrated product and process engineering system as an object external to the integrated product and process engineering software framework;
storing the TDPP and a validity constraint of the TDPP with the product design;
creating an engineering change number reflecting that an update occurred for the product design model; and
storing the product design model as a new version along with the associated engineering change number;
wherein the new version is valid so long as all TDPPs in the product design model remain valid.

2. The method of claim 1, further comprising:
when a validity constraint of a stored TDPP in the product design model expires, identifying a product component associated with the invalid TDPP,
reading product component data, including data from the invalid TDPP, from a data object associated with the product component;
based on the product component data, determining if the product component should remain in the product design model,
wherein if the product component is to remain in the model:
revising the TDPP data and the TDPP validity constraint associated with the product component to make the TDPP active, and
storing the revised active TDPP and the revised TDPP validity constraint with the product design model, and
wherein if the product component is to change in the model,
creating a new TDPP associated with a replacement product component, the new TDPP having a new validity constraint; and
storing the new TDPP and the new TDPP validity constraint with the product design;
if a new TDPP is created, creating a new engineering change number to reflect that a new update has occurred for the product design model; and
storing the product design model as a revised version along with the new engineering change number.

3. The method of claim 1, wherein the TDPP is an extension of a node of the production process and has a parameter value and a start time.

4. The method of claim 3, wherein an effective time period of the TDPP is defined by the start time of the TDPP and the start time of a subsequent TDPP.

5. The method of claim 4, wherein the engineering change number has an effective time period defined by an engineering change number start time and an engineering change number end time.

6. The method of claim 5, wherein the validity constraint of the TDPP expires when the effective time period of the TDPP does not overlap the effective time period of the engineering change number.

7. The method of claim 1, wherein the validity constraint is represented by a first icon if the corresponding TDPP is valid and a second icon if the corresponding TDPP is invalid.

8. The method of claim 1, wherein the TDPP is selected from the group consisting of component consumption, mode duration, resource capacity consumption, and activity scrap.

9. The method of claim 1, further comprising storing the TDPP with the product design by product variant, wherein each product variant of the product design is characterized by a minor alteration of the product design.

* * * * *

UNITED STATES PATENT AND TRADEMARK OFFICE
CERTIFICATE OF CORRECTION

| | |
|---|---|
| PATENT NO. | : 7,603,262 B2 |
| APPLICATION NO. | : 10/850796 |
| DATED | : October 13, 2009 |
| INVENTOR(S) | : Chen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this

Fifth Day of October, 2010

David J. Kappos
*Director of the United States Patent and Trademark Office*